United States Patent [19]
Skogsholm et al.

[11] 3,852,657
[45] Dec. 3, 1974

[54] COMMUTATION CONTROL FOR INVERTER CIRCUIT

[75] Inventors: Einar A. Skogsholm; John G. Tracy, both of Erie, Pa.

[73] Assignee: General Electric Company, Erie, Pa.

[22] Filed: Nov. 19, 1973

[21] Appl. No.: 417,239

[52] U.S. Cl. .............................. 321/18, 321/45 C
[51] Int. Cl. ...................... H02m 7/52, H02m 1/18
[58] Field of Search ............ 321/45 R, 45 C, 18, 43; 331/113 S

[56] References Cited
UNITED STATES PATENTS

| | | |
|---|---|---|
| 3,207,974 | 9/1965 | McMurray ....................... 321/45 R |
| 3,641,421 | 2/1972 | Graf et al ......................... 321/45 C |

*Primary Examiner*—R. N. Envall, Jr.
*Attorney, Agent, or Firm*—Arnold E. Renner; Harold H. Green, Jr.

[57] ABSTRACT

An inverter circuit utilizing controlled rectifiers for changing direct current power to alternating current power is provided with control apparatus which includes means to sense variations in an operational parameter to provide compensation to insure that a current utilized to commutate or turn off a conducting rectifier is maintained substantially constant.

19 Claims, 6 Drawing Figures

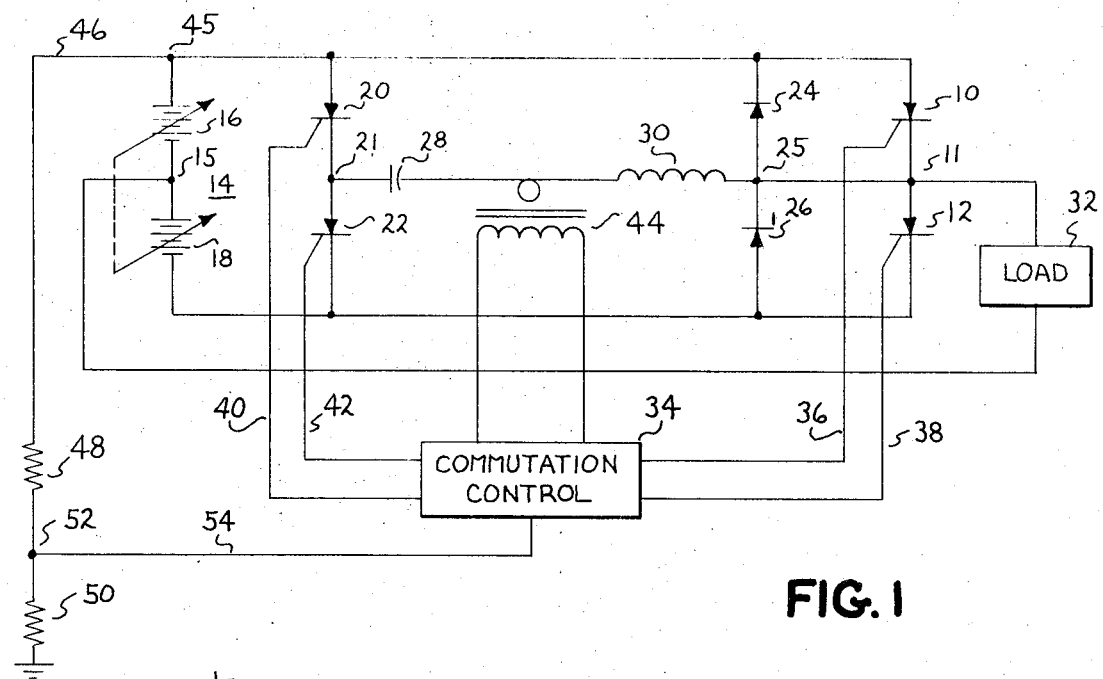
FIG.1
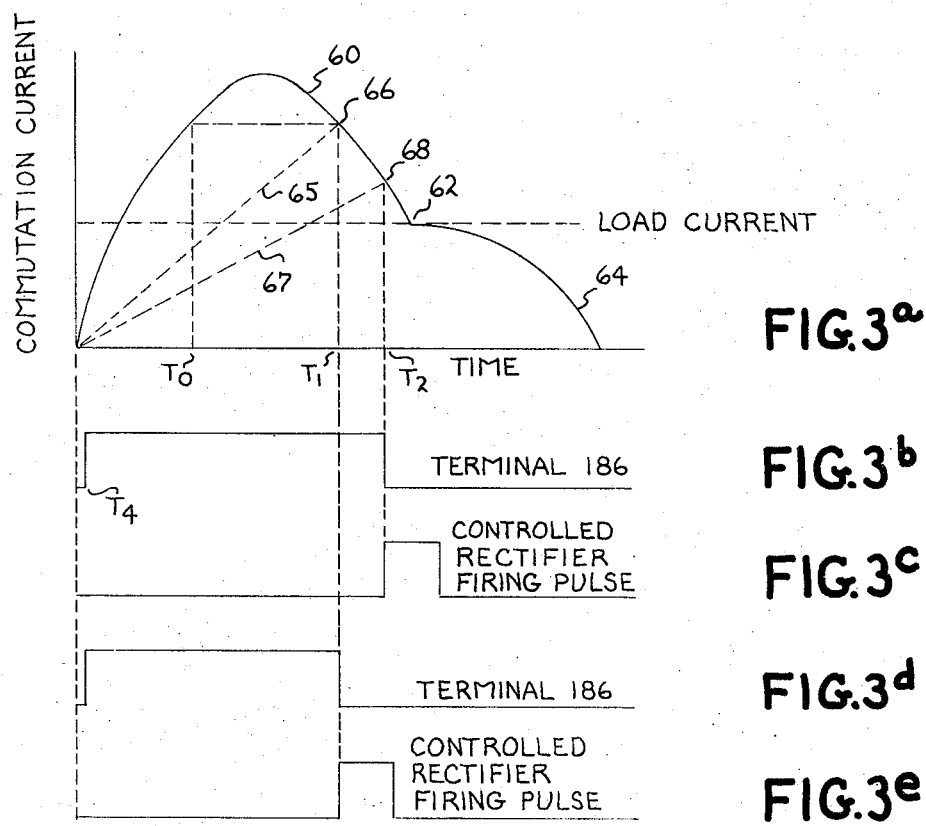
FIG.3a
FIG.3b
FIG.3c
FIG.3d
FIG.3e

COMMUTATION CONTROL FOR INVERTER CIRCUIT

BACKGROUND OF THE INVENTION

The present invention relates generally to inverter circuits for changing direct current electric power to alternating current electric power and more particularly to an inverter circuit control means which compensates for variations in an operational parameter; e.g. variations in the level of the direct current power supply, to maintain a current utilized to commutate or turn off a then conducting rectifier substantially throughout a wide range of operating conditions.

The present invention is generally applicable to those inverter circuits which employ the discharge of a suitable charge storage device such as a capacitor to supply the necessary current to back-bias a then existing conducting rectifier and is particularly applicable to the control of commutation in inverter circuits of the type disclosed and claimed by U.S. Pat. No. 3,207,974, "Inverter Circuits" by W. McMurray, issued Sept. 21, 1965 and assigned to the assignee of the present invention. While the present invention will be described with respect to an inverter such as is taught by the aforementioned McMurray patent, a more complete description and understanding of which is provided by that patent, it is to be expressly understood that the invention is not to be so limited.

In inverter circuits of this general type, direct current electric power is changed or inverted to alternating current power by means of load current carrying controlled rectifiers such as silicon controlled rectifiers (SCRs) which are commutated or turned off by suitable commutating circuitry including additional controlled rectifiers. By way of example, direct current power is inverted to single phase alternating current power by means of a pair of controlled rectifiers and a commutating circuit including a respective pair of controlled commutating rectifiers and a commutating capacitor. In a multiphase inverter system similar circuitry is provided for each phase. To commutate a particular load rectifier to the "off" condition, a corresponding commutating rectifier is turned on to connect a series oscillatory circuit which includes the associated capacitor and, normally, an associated inductor across the load rectifier. A current pulse produced by the discharging series oscillatory circuit takes over the function of supplying the load current on a temporary basis. When the current in the commutation circuit exceeds the load current, the load rectifier which is then conducting is reversely biased and commutated or turned off, assuming of course that the reverse bias lasts a period of time and is of sufficient magnitude to cause the rectifier to be sufficiently backbiased. The commutating capacitor is then charged in a direction opposite to that previously existing so as to backbias the commutating rectifier included in the circuit and to be of a polarity suitable for commutating the second of the load rectifiers.

The usual practice and operation of this type of inverter circuit is to turn on the second load rectifier after the first load rectifier has been turned off and the commutating capacitor has been fully recharged. Operation in this manner results in a commutation period that is load dependent, the total time required for commutation increasing with decreasing load current.

While this mode of operation is satisfactory and desirable for many applications there are some applications of inverter circuits where extremely rapid commutation is required at all load levels. For example, it may be desirable to control the average voltage level of electric power supplied to a load by means of time ratio switching of load current carrying controlled rectifiers as taught by U.S. Pat. No. 3,694,718, "Methods of Inverter Voltage Control by Superimposed Chopping" by C. E. Graf, et al, issued Sept. 26, 1972 and assigned to the assignee of the present invention. Utilizing time ratio switching of load rectifiers as taught by the aforementioned patent has heretofore been limited to a great degree at low load levels due to the load dependence of the commutation.

In order to overcome the basic disadvantages of load current dependency, it is known to provide the commutation of inverter circuits in a manner which is substantially independent of the commutation time voltage and current by monitoring the commutation current during commutation of a load rectifier and to provide means for turning on the other load rectifier when the commutation current decays to a predetermined level. This system is described and claimed in U.S. Pat. No. 3,641,421, "Commutation Control For Inverter Circuits" by C. E. Graf, et al, issued Feb. 8, 1972 and assigned to the assignee of the present invention which patent is expressly incorporated hereinto by reference. The invention of that patent while solving the basic difficulties occurring in time ratio switching did not fully meet the needs of industry when the direct current voltage supply was varied. Specifically, in certain instances, as will be explained below, it was found desirable to vary the voltage of the direct current supply to achieve certain operating characteristics and capabilities. The aforementioned U.S. Pat. No. 3,641,421 in certain circumstances failed to provide sufficient commutation current when the direct current source voltage was decreased a substantial amount.

Inverters of the type here being discussed are normally run with a substantially constant direct current supply. There are, however, instances when it is desirable to vary the value of the direct current supply. For example, when employing SCRs in a time ratio switching mode as previously mentioned with respect to U.S. Pat. No. 3,694,718 (which type of switching is sometimes referred to as pulse width modulation) the capacity of the SCRs is sometimes exceeded on a frequency basis. That is, the heating effect of an SCR is due in part to the frequency which it is turned on and off. In pulse width modulation operation, the frequency of switching is much higher due to the fact that what might be considered as a half cycle of the base operating frequency is divided into a plurality of pulses. If, for example, a particular SCR has a limit of a 1 KHz, the existence of even a single change within the base frequency will limit the base frequency to 333 Hz. If a higher base frequency is desired, then the pulse width modulation must be discontinued and the procedure has been to use a square wave and to then vary the base frequency. In the example presently being used, the base frequency could then be taken to the full 1 KHz. Concurrently with the discontinuation of the pulse width modulation, however, it is often necessary to reduce the direct current supply voltage in order to retain the proper power delivery to the load. Such a reduction in supply voltage often raises problems of commutation in that the capacitor used to provide the commutation current fails to achieve sufficient charge to insure the commutation of a conducting SCR resulting in a commutation failure and poor regulation of the load on the inverter. Similarly, if it was desired to reduce the voltage for some other reason, the same result would occur.

SUMMARY OF THE INVENTION

It is, therefore, an object of the present invention to provide an inverter circuit having insured commutation over a wide range of circuit operating parameters.

Another object is to provide improved commutation for inverter circuits in which the commutation current is substantially independent of the load and of limited variations in the supply voltage.

Still another object is to provide an improved commutation control for inverter circuits which control is self-adjusting for variations in direct current supply voltage.

Briefly stated, the present invention provides for an inverter circuit including a commutation control apparatus including means for sensing the commutation current during commutation of a load rectifier and further provides for means to turn on a second load rectifier when the commutation current decays to a level, which level is dependent upon an operating circuit parameter, for example, supply voltage or load current.

BRIEF DESCRIPTION OF THE DRAWINGS

Although the novel features of this invention are set forth with particularity in the claims annexed to and forming a part of this specification, the invention, both as to organization and content will be better understood and appreciated along with other objects and features thereof from the following detailed description taken in conjunction with the drawings in which:

FIG. 1 is a schematic circuit diagram of a single phase inverter power circuit and control apparatus therefore in accordance with the present invention;

FIGS. 3a through 3e are graphical representations of operating signals useful in the understanding of the circuit of FIG. 2;

DETAILED DESCRIPTION

Figure 2:
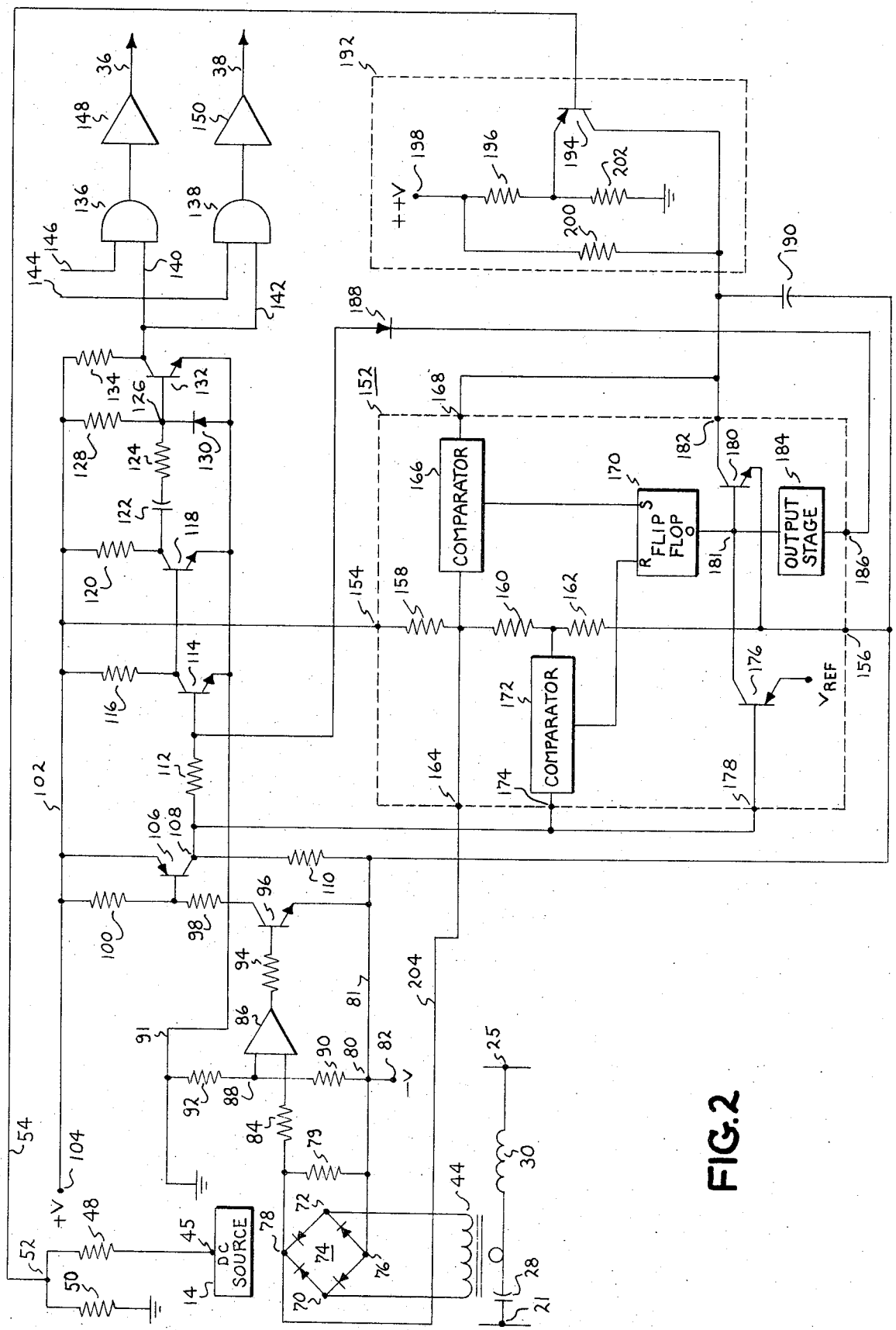
FIG. 2 is a schematic representation of the preferred embodiment of the commutation control apparatus of FIG. 1.

Referring now to FIG. 1 there is shown a single phase inverter circuit of the type disclosed and claimed in the above-identified McMurray patent. The inverter circuit includes a pair of load controlled rectifiers 10 and 12 connected in series across a source of direct current electrical power 14. The source 14 is shown as a battery comprised of two segments 16 and 18 illustrated as being variable in accordance with the preferred embodiment of the present invention. Two additional controlled rectifiers 20 and 22 commonly called commutating rectifiers are connected in series across the direct current source 14 in parallel with the load rectifiers 10 and 12. The rectifiers 20 and 22 are poled in the same direction as the load rectifiers. The controlled rectifiers 10, 12, 20 and 22 are preferably silicon controlled rectifiers (SCRS) but it will be obvious that functionally equivalent devices such as gaseous thyratrons may be used. Also connected in parallel with the direct current source 14 are two diode rectifiers 24 and 26 in a series connection and poled in a direction which is opposite to that of the controlled rectifiers. A series arrangement of a capacitor 28 and an inductor 30 is connected between a junction 21 between the two commutating rectifiers 20 and 22 and a junction 25 between the two diodes 24 and 26. Junction 25 is also directly connected to a junction point 11 which exists between the two load rectifiers 10 and 12. A suitable load 32, such as a single phase alternating current motor, is connected between the junction 11 and a junction 15 existing between the two segments 16 and 18 of the direct current source 14, such that the load 32 receives power from the direct current source 14 through the inverter circuit.

As further illustrated in FIG. 1, there is provided a commutation control circuit 34 for providing pulses to the gate electrodes of each of the controlled rectifiers 10, 12, 20 and 22 respectively through leads 36, 38, 40 and 42. In accordance with the present invention, the commutation control 34 has an associated current transformer 44 and further includes apparatus for sensing the commutation current for controlling the firing of the controlled rectifiers 10 and 12 in a manner as is more completely set forth hereinafter. In accordance with the preferred embodiment of the present invention, a feedback path is supplied to the commutation control 34. This feedback path comprises a conductor 46 taken from the positive terminal (junction 45) of the supply segment 16 to supply a signal to a voltage divider network including a pair of series resistors 48 and 50, the other end of the series arrangement being connected to a suitable reference such as ground. From a junction 52 taken between the two resistors 48 and 50 a feedback signal is supplied via a conductor 54 to the commutation control 34.

Before turning attention to the control apparatus of the present invention, the general mode of operation of the inverter circuit of FIG. 1 will be briefly described. A more complete description may be found in the aforementioned McMurray patent. Let it be initially assumed that rectifier 12 is not conducting and that rectifier 10 is conducting current to the load 32 from the upper segment 16 of the direct current power supply 14 and that the capacitor 28 is charged with its right hand plate positive; that is, the plate of the capacitor 28 connected to the inductor 30 is positive with respect to that plate connected to junction 21. The charge on the capacitor 28 will have been acquired during the previous operation. To commutate or turn off the controlled rectifier 10, controlled rectifier 20 is rendered conductive or is fired by means of a suitable firing pulse supplied from the commutation control 34 through line 40. The firing of rectifier 20 connects a series oscillatory circuit including the capacitor 28 and the inductor 30 across the load rectifier 10. The discharging of the capacitor 28 produces a current pulse in the series oscillatory circuit which will build up to a level exceeding the load current which at this time is flowing from junction 11 downwardly through the load 32 to junction 15 of the direct current power source 14. This current pulse temporarily takes over the function of supplying load current and causes the diode 24 to be forwardly biased and the load rectifier 10 to be reversely biased. In an operative embodiment of the inverter, the components are selected such that the reverse bias across the controlled rectifier 10 is of a sufficient magnitude and duration to insure that the load rectifier is turned off or commutated and thereby assumes a blocking mode of operation. Capacitor 28, commonly referred to as a commutating capacitor, will now charge up in a direction opposite to that previously assumed such that its left hand plate is positive with respect to the right hand plate. Discharging is a function both of the "ringing" of the oscillatory circuit in a counterclockwise direction through the diode 24 and the controlled rectifier 10 as well as current being supplied to the load through the commutating rectifier 20 from the source segment 16. Capacitor 28 is now charged in a direction to be able to commutate the load rectifier 12 upon subsequent operation. This latter commutation is essentially identical to that with respect to the commutation of load rectifier 10, utilizing the commutating rectifier 22 which is rendered conductive to commutate the controlled rectifier 12.

Before beginning the detailed description of FIG. 2 which shows the apparatus of the present invention in its preferred embodiment it is believed advantageous to look briefly to the graphical representation of FIG. 3a. In FIG. 3a there is shown the relationship, with respect to time, of the commutation current in the case of an inductive load such as would be the case if load 32 in FIG. 1 were a motor. A portion of the curve labeled 60 in FIG. 3a represents the waveshape current through the capacitor 28 of FIG. 1 (commutation current) during that period of time prior to the reaching of a value equal to the load current. A second portion of curve labeled 64 represents the commutation current which exists through the capacitor and through the appropriate diode 24 or 26 after the commutation of the respective load rectifier 10 or 12. As will be appreciated by those skilled in the art, the point at which the originally nonconducting load rectifier is fired during the commutation cycle will determine, to a large extent, the amount to which the capacitor 28 of FIG. 1 is charged or "pumped up" in anticipation of the next commutation cycle. That is, the earlier in time at which the originally nonconductive rectifier is fired, the greater the proportional amount of charge on the capacitor 28. With respect to FIG. 3a it is seen then that if the load rectifier is fired at point 66 as shown on the graph, a greater charge will normally be present or be accumulated on the capacitor 28 than if the firing occurs at point 68. There are, of course, limits as to how early the originally nonconducting rectifier may be fired to insure stability within the circuit. Specifically, firing cannot occur at too early a point within the cyle such that there would exist an insufficient amount of time with a current of sufficient magnitude to insure commutation of the originally conducting rectifier. As shown in FIG. 3a, the time between T0 and T1 must be sufficiently long to enable commutation of a rectifier. It will be further appreciated by those skilled in the art that the amount of capacitor charging that will occur will tend to diminish as the value of the source voltage goes down. It is, therefore, desirable to fire at an earlier time or at a higher level on the commutation circuit curve with a reduced source voltage than it might be in the case of a higher source voltage. While it is possible to build a system in which the originally nonconducting load rectifier is always fired early enough in time to insure a sufficient charge on the capacitor, the circuit losses and requirement of a larger capacitor make this an undesirable solution to the problem. The present invention provides for means for adjusting the time or level of controlled rectifier firing in accordance with an operating parameter of the circuit which is dependent in some way upon the diminishment of a source voltage. This adjustment is achieved through a timing relationship which in the preferred embodiment is best understood with respect to FIG. 2.

Referring now to FIG. 2, there is shown in detail the means within the commutation control 34 for firing the load rectifiers 10 and 12 in accordance with the present invention in its preferred embodiment. As is illustrated, the transformer 44, which senses the current through the commutation circuit including the capacitor 28 and the inductor 30, has its secondary connected to input terminals 70 and 72 of a full wave diode bridge 74. Output terminals of the bridge 74, terminals 76 and 78 are further provided. Output terminal 76 is connected to a junction 80 which in turn is connected to a relatively negative voltage source indicated at terminal 82 and labeled −V. A loading resistor 79 is connected between the terminals 76 and 78 to provide a suitable voltage signal proportional to the commutation current. Terminal 78 of the bridge 74 is further connected through a resistor 84 to an operational amplifier 86 which acts as a comparator as will be further explained. A second input to the operational amplifier 86 is from a junction 88 which exists between two resistors 90 and 92 forming a voltage divider network which is placed between the negative voltage supply at terminal 82 and a common bus 91 which for purposes of illustration here is at ground. The input from the voltage divider serves to bias the operational amplifier 86 such that when the value of the signal applied to its terminal through resistor 84 exceeds that applied via terminal 88 there is provided at the output of the operational amplifier or comparator 86 a signal which is applied through a resistor 94 to the base of a NPN transistor 96. The collector of transistor 96 is connected through the series combination of a pair of resistors 98 and 100 the free end of which is connected to a positive bus 102. The positive bus 102 terminates at a point 104 to which there is applied a relative positive voltage indicated by +V.

A second transistor 106, shown to be of the PNP type, has its emitter connected to the positive bus 102 and its base connected to the juncture of the two resistors 98 and 100. The collector of transistor 106 is joined to a junction 108 which junction is connected to the negative bus 81 via a resistor 110. Junction 108 is connected by way of a resistor 112 to the base of the third transistor 114 which has its emitter connected to the common bus 91 and its collector connected to the positive bus 102 by way of a resistor 116 and to the base of an additional transistor 118 which, similarly to transistor 114, has its emitter connected to the common bus 91 and its collector connected through a resistor 120 to the positive bus 102.

The collector of transistor 118 is further connected through a series arrangement of a capacitor 122 and a resistor 124 to a junction 126 which junction is in communication with the positive bus 102 by way of a resistor 128 and to the negative bus 91 via a diode 130 having its anode connected to the bus 91. Junction 126 also forms an input to the base of an additional NPN transistor 132 having its collector in communication with positive bus 102 by way of a resistor 134 and its emitter connected to the common bus 91.

A pair of AND gates 136 and 138 have input legs 140 and 142, respectively, connected to the collector of the transistor 132. A second leg 146 of AND gate 136 is connected to a suitable means for supplying thereto an inhibit signal of relatively long duration during commutation of the controlled rectifier 10 and firing of controlled rectifier 12. A second input leg 144 to AND gate 138 is connected to a suitable means for supplying thereto an inhibit signal of relatively long duration during commutation of the controlled rectifier 12 and firing of the controlled rectifier 10. In accordance with the operation of the present invention, a firing signal pulse is produced at the collector of transistor 132 at the appropriate firing time to be explained hereinafter and the logic network including AND gates 136 and 138 directs the firing pulse to the controlled rectifier not undergoing commutation over the appropriate one of the conductors 36 and 38 by way of two amplifiers, 148 and 150 respectively, which are included solely for the purpose of amplifying the signals to a level required for the firing of the controlled rectifiers 10 and 12.

Further depicted in FIG. 2 is circuitry within a dotted lined box 152 which circuitry in the commercial embodiment of the present invention is included on an integrated circuit chip sold by Signetics Corporation as "Timer 555." This circuitry performs the timing function previously mentioned. Power is supplied to the timer 152 by means of a connection from the positive bus 102 to a terminal 154, a second power terminal 156 being connected to the negative bus 81. Intermediate the two power terminals 154 and 156 is a voltage divider network including three resistors 158, 160 and 162. A first two input comparator 166 has its first input from a terminal 168 which in turn is connected to a terminal 182 of the circuit 152. The second input to the comparator 166 is taken from the junction of resistor 158 and 160 which junction is further tied through a terminal 164 to the output terminal 78 of the diode bridge 74. A second two input comparator 172 is connected via a terminal 174 to the collector of transistor 106 and is further connected to a terminal 178 of the circuit 152. The second input to comparator 172 is from the junction of the two resistors 160 and 162. The outputs of the two comparators 166 and 172 form inputs to the set and reset terminals, respectively, of a flip-flop 170 the output of which is connected to the collector of a transistor 176 having its base connected to the terminal 178. The emitter of transistor 176 is connected to a suitable positive reference voltage ($V_{REF}$). The output of the flip-flop 170 is further connected to the base of a second transistor 180 which has its collector connected to the terminal 182 and its emitter connected to the negative bus 81 via terminal 156. The output of the flip-flop 170 forms the input to an output stage 184 the output of which is connected to a terminal 186 of the timer 152.

A diode 188 has its anode connected to the base of transistor 114 and its cathode connected to terminal 186 of the circuit 152 (the output of output stage 184). A capacitor 190 is connected between the negative bus 81 and junction 182 (the collector of transistor 180).

The final showing of FIG. 2 is basically included with the dotted lined box 192 and forms the essence of the feedback or compensation control of the present invention. Included within box 192 is a PNP transistor 194 having its base connected via the lead 54 to the voltage divider consisting of resistors 48 and 50 which, in the preferred embodiment being illustrated as is best seen in FIG. 1, is connected to the positive terminal 45 of the direct current voltage source 14. The emitter of transistor 194 is connected by way of a resistor 196 to a terminal 198 to which is connected a positive voltage indicated as ++V. This voltage is also connected by way of a resistor 200 to the junction of capacitor 190 and the collector of transistor 180. A third resistor 202 connects the emitter to a common or ground such that there is applied at the emitter a bias by way of the voltage divider including the resistors 196 and 202.

The operation of the circuitry of FIG. 2 will now be described. Assume first that the controlled rectifier 10 is to be commutated and that the commutating rectifier 20 has been turned on (FIG. 1). With these existing circumstances, the commutation current will initially be very small such that the input from terminal 78 of the bridge 74 as applied to the operational amplifier 86 is insufficient to cause a positive output signal. Transistor 96 is now in the nonconducting state and inasmuch as the base of transistor 106 is positive it also will be nonconductive. The collector of transistor 106, as well as the base of transistor 114, will be at essentially the negative bus level such that transistor 114 is not conductive. With transistor 114 nonconductive its collector which is tied to the base of transistor 118 will be at the voltage level of the positive bus 102 such that transistor 118 will be in the conducting state placing its collector voltage at the voltage of the common bus 91. Transistor 132 also will be conducting since its base is connected to the positive bus 102 through resistor 128 thereby maintaining its collector at the voltage of the common bus 91. This voltage applied to AND gates 138 and 136 will be less than sufficient to enable these AND gates and no conduction signal will be applied to the load rectifiers. When the commutation current as seen through the transformer 44 builds up to a sufficient value, the signal applied from the bridge terminal 78 through resistor 84 to the operational amplifier 86 will exceed the value of the bias applied to the other input of that amplifier as seen at terminal 88. When the former signal exceeds the latter, operational amplifier working as a comparator outputs a positive voltage signal through resistor 94 to the base of transistor 96 rendering it conductive. When transistor 96 conducts the voltage on the base of transistor 106 as seen through the voltage divider including resistors 98 and 100 will be reduced rendering that transistor conductive such that the positive bus voltage of terminal 104 will now exist at the junction 108 at the collector of transistor 106 which voltage is then applied to terminals 174 and 178 of the timer circuit 152.

Circuit 152 is designed such that when the voltage applied to its input terminals 174 and 178 is increased the signal at terminal 186, the output of the output stage 184 which performs an inversion function, will also increase. This may be seen from the fact that the PNP transistor 176, which was previously conducting and clamping junction 181 at the $V_{REF}$ level, is now rendered nonconductive and the restriction on that junction is removed. In addition, comparator 172 now has the positive bus voltage applied to its input terminal 174 while its other input terminal is tied to the junction between the two resistors 160 and 162 which will be a voltage lower than the positive bus 102. Thus, comparator 172 will output a signal to the flip-flop 170 placing that flip-flop into its reset state which in turn effects a positive output at terminal 186 through the inverting output stage 184.

When the voltage at terminal 186 rises, diode 188 is biased in the reverse direction such that that diode can no longer conduct. This diode was clamping the base of transistor 114 to the lower voltage previously existing at the terminal 186 of circuit 152 and with the removal of this clamp the positive voltage at the collector of transistor 106 is applied through resistor 112 to the base of transistor 114 allowing that transistor to conduct. When transistor 114 conducts its collector which is tied to the base of transistor 118 goes to the voltage level of the common bus 91 causing transistor 118 to stop conducting and capacitor 122 will charge until its left hand plate, connected to the collector of transistor 118, reaches the potential of terminal 104.

It will be remembered that previous reference was made to the change in voltage at terminal 178 of the circuit 152. Returning again to that area, when transistor 106 was nonconducting, the collector was at a low voltage and this voltage appearing at input terminal 178 permitted transistor 176 to conduct thus applying the positive voltage to the base of transistor 180 thus permitting it to conduct. With transistor 180 conducting, the upper plate of capacitor 190 which is connected to the collector of transistor 180 was connected to the negative bus 81 such that the charging of that capacitor was prohibited. When, however, the voltage at terminal 178 rose due to the conduction of transistor 106 transistor 176 was turned off and transistor 180 is rendered nonconductive such that capacitor 190 is now free to charge with its top plate positive. This charging is accomplished as shown in FIG. 2 through the voltage compensation circuit 192. That is, the large positive voltage shown as ++V appearing at terminal 198 will now provide a current through the resistor 200 to charge the capacitor 90 with its top plate positive. The rate of charging of capacitor 190 is dependent upon the conductive state of transistor 194 which transistor in association with its circuitry provides the voltage feedback compensation accordingly with the present invention as will be further explained hereinafter.

It will be noted that the upper plate of capacitor 190 is connected to terminal 168 of the circuit 152. This terminal forms one input of a comparator 166 the other input of which is connected to terminal 164 which in turn is connected via a line 204 to terminal 78 of the bridge 74. When the capacitor voltage appearing at terminal 168 equals that of appearing at terminal 164 (the commutation current voltage) comparator 166 will output a signal to flip-flop 170 causing it to set resulting in a low voltage signal from the output stage 184 at terminal 186. This may be better understood by reference to FIGS. 3a and 3b. FIG. 3a, as previously stated, illustrates by curve 60 the voltage waveshape of the commutation current. As the commutation current begins to build up, terminal 186 will achieve a high level as shown at time $T_4$ (FIG. 3b) resulting in the reverse biasing of diode 188. Terminal 186 will stay high until such time, as was just described, as capacitor 190 reaches a value equal to that of the commutation current voltage. This is shown in FIG. 3a by the intersection of dashed line 67, representing the charging of the capacitor 190, at the point 68 with the curve 60. When the output at terminal 186 of the circuit 152 drops as shown at time $T_2$ in FIG. 3b, diode 188 will no longer be reversely biased and conduction by that diode is possible.

With conduction of diode 188, transistor 114 is once again turned off in that its base is now at a voltage prohibiting conduction allowing the base of transistor 118 to rise and to begin to conduct. It will be remembered that capacitor 122 is at this time charged with its left hand plate positive. When transistor 118 begins to conduct, capacitor 122 will rapidly discharge through transistor 118. The rapid discharge of capacitor 122 will momentarily drop the voltage at the base of transistor 132 to a level below that required for conduction, turning off of transistor 132 with a resultant rapid increase in the potential at its collector. This increased potential signal will be transmitted through AND gate 138 to be amplified by the amplifier 150 to provide an output pulse (shown in FIG. 3c ) on line 38 to turn on load rectifier 12. Immediately following discharge of the capacitor 122 a sufficient "turn on" voltage will be reestablished at the base of transistor 132 and its collector potential will return to that of the common bus 91. It will thus be appreciated that a firing pulse is produced at the collector of transistor 132 for turning on the non-commutated controlled rectifier when the commutation current reaches a level established by the voltage on the capacitor 190. In effect, transistor 132 is a voltage responsive switching device permitting current flow therethrough when voltage supplied to its base is sufficient to turn it on and preventing current flow therethrough when the voltage supplied to its base is insufficient to turn it on.

It should be noted that the collector of transistor 132 is connected as an input to each of the AND gates 135 and 138 which permit respectively the passage of signals to the load rectifiers 10 and 12. Additional leads 146 and 144 are connected as other inputs to the AND gates 136 and 138 respectively, these leads being connected to suitable sequencing which determines which load rectifier to be rendered conductive in accordance with established wellknown procedures in the art and not forming a part of the present invention.

It will be immediately obvious to those who are completely familiar with the aforementioned Graf, et al, U.S. Pat. No. 3,641,421 that the circuitry thus far described in the present application bears a resemblance to the circuitry described in that patent. Specifically, Graf establishes a fixed level for the firing of the load rectifiers whereas the present invention provides a ramp function, determined by the charging of the capacitor 190, to determine the time of rendering the load rectifiers conductive. The present invention, however, as well as differing in the method of determining the firing point, has the additional feature now to be described of compensating for variations in circuit parameters. Specifically, in the present invention in its preferred embodiment, the parameter to be monitored is that of a variation in the source voltage; that is, a variation in the voltage of the source 14 as seen in FIG. 1.

Referring again to FIG. 2 previous reference was made to the compensating circuit 192. As shown in FIGS. 1 and 2 there is provided a feedback path by means of line 54 from a voltage dividing network consisting of a pair of resistors 48 and 50 which are connected between the terminal 45 at one end of the voltage source and ground. The signal appearing on line 54 will, therefore, be a function of the value of that source. This feedback signal, as shown in FIG. 2, is supplied to the base of a PNP transistor 194 the emitter of which is connected at the junction of the two resistors 196 and 202 forming a voltage dividing network between the terminal 198 (++V) and ground. The collector of transistor 194 is connected to the top terminal of the capacitor 190. By properly selecting the components, particularly the resistors 196 and 202, and the resistors of the voltage divider 48 and 50 the signal appearing on line 54 applied to the base of transistor 194 will be of a value such that at full supply voltage transistor 194 will be nonconductive. In this situation, the charging of the capacitor 190 will be solely a function of the voltage at terminal 198 and resistor 200 in the manner previously described and the operation will be that just described with the charging of capacitor 190 following line 67 and intersecting the commutation current curve at point 68 to provide the signals illustrated in FIGS. 3b and 3c.

If, however, the voltage of the source were to be reduced, the signal appearing on line 54 to the base of transistor 194 will be reduced and transistor 194 will begin to conduct. The degree of conduction by this transistor can be made a function of the difference in voltages appearing at its base and emitter. Assuming now that the source voltage is decreased, transistor 194 will begin to conduct such that capacitor 190 is charged through the parallel paths of resistor 200 and the circuit including resistor 196 and the emitter to collector circuit of transistor 190. Capacitor 190 will now charge at a faster rate than previously. This is illustrated in FIG. 3a by line 65 which line intersects the commutation current curve 60 at point 66. With the faster charging of capacitor 190 it is seen that the output terminal 186 will go to a low level at an earlier point in time such as is shown in FIG. 3d allowing the firing of the noncommutated load rectifier at an earlier point in time. The point in time at which the firing pulse is a function of the time at which the charging of the capacitor reaches a voltage intersecting the commutation current curve. That is, the faster the capacitor charges the earlier in time that the firing will occur. Further reduction of the direct current source voltage will result in increase conduction by transistor 94 and a faster rate of charging of capacitor 190.

Thus, it is seen that there has been shown and described an inverter circuit which is fully operational and which includes control to compensate for a variation in a circuit parameter to provide for the firing of load rectifiers at a point of time to insure that the commutation current remains substantially constant and sufficient to commutate the load rectifiers.

Figure 4:
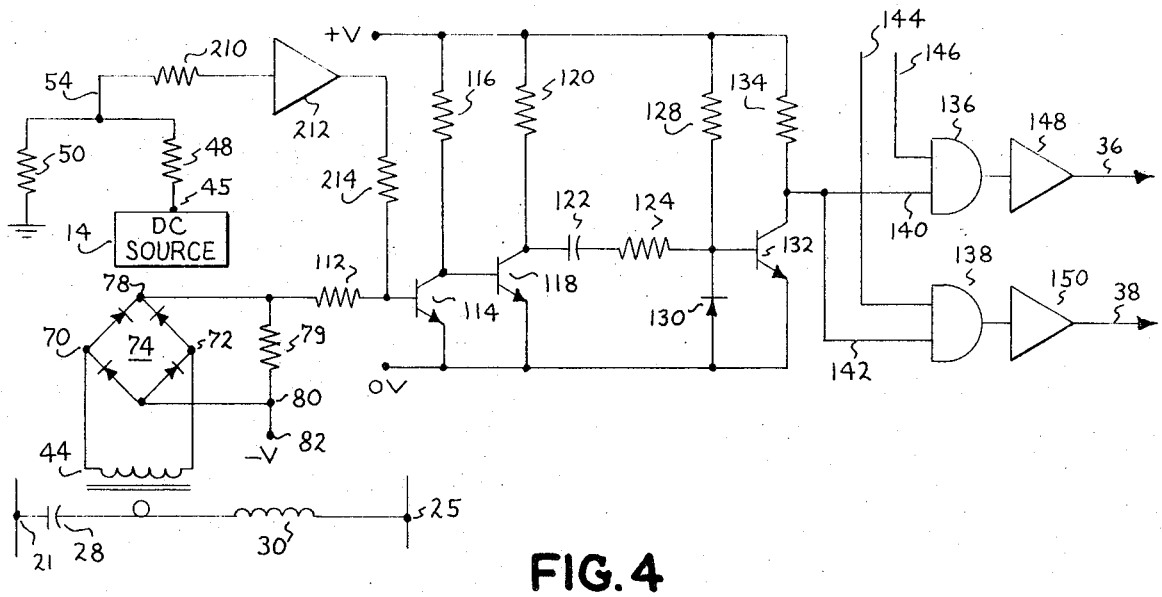
FIG. 4 is a schematic diagram illustrating the employment of the present invention in a second embodiment.
Figure 5:
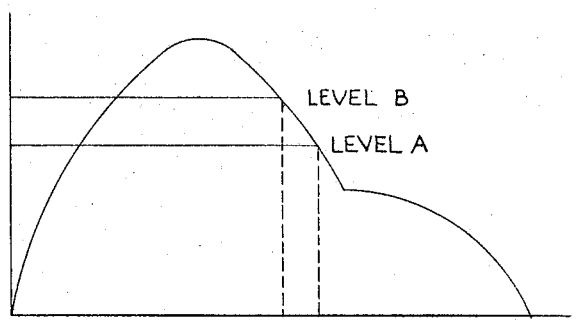
FIG. 5 is a graphical representation useful in understanding the embodiment shown in FIG. 4; and, FIG. 6 is a schematic drawing showing a third embodiment of the present invention using load current as as operating parameter.

FIG. 4 illustrates the manner in which the present invention might be applied to the circuitry of the Graf, et al, U.S. Pat. No. 3,641,421. The depiction of FIG. 4 is essentially that shown by the Graf, et al, patent with the notable exception of the further inclusion of the feedback or compensation feature of the present invention. The reference characters utilized in this figure are identical to those utilized with respect to FIG. 2 with the voltage of the load resistor 79 being applied through a resistor 112 to the base of transistor 114. In this embodiment the compensating feedback feature, as illustrated, is provided as before from the voltage divider including resistors 48 and 50 connected to terminal 45 of the direct current source 14. The signal on line 54 is applied through a resistor 210 to the input of a suitable amplifier 212, such as a simple transistor amplifier. The output of amplifier 212 is applied to the base of transistor 114 by way of a resistor 214. By properly selecting the components of this feedback circuit; i.e., resistors 48, 50, 210 and 214 and amplifier 212, the level of commutation current at which transistor 114 will begin to conduct and hence initiate the firing of the appropriate load rectifier may be varied in accordance with an operating parameter of the circuit, here shown as the value of the source voltage. This is illustrated in FIG. 5 wherein the normal or full source voltage firing point is depicted at level A. If the source voltage were to drop, the voltage applied by the feedback circuit to the base of transistor 114 would decrease resulting in an earlier firing as shown by the line labeled "level B" to achieve the same basic purpose as was set forth with respect to the circuit of FIG. 2.

Figure 6:
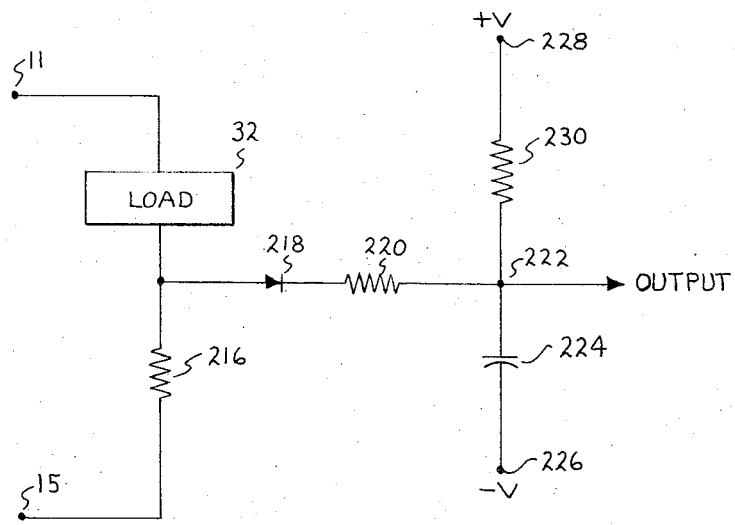

In inverter circuits of the type here being discussed it is known that a higher load current will normally require a higher commutation current. FIG. 6 illustrates one manner in which the principles of the present invention may be employed to monitor operating parameters other than source voltage and, in this case, to provide a commutation current which varies as a function of the load current. Referencing now FIG. 6, there is shown a load 32 which may be the load of FIG. 1. Connected in series with the load 32 is a load resistor 216 which will have developed across it a voltage which is proportional to the value of the load current. The voltage across resistor 216 is applied as a signal through a diode 218 and a resistor 220 to a junction 222. A capacitor 224 is connected between junction 222 and a source of negative voltage (−V) at a terminal 226. A source of positive voltage (+V) at a terminal 228 is applied via a resistor 230 to the junction 222 and hence to the upper plate of the capacitor 224. Capacitor 224 may be likened to capacitor 190 in FIG. 2 and the feedback circuit of this figure may be substituted for that shown in FIG. 2. In operation, the rate at which capacitor 224 will charge will be a function of the value of the voltage at terminal 228 and the value of the voltage across the load resistor 216. As the load current varies, so too will the load resistor voltage. Thus, if the load current increases, capacitor 224 will charge at a faster rate. If now the circuit of FIG. 6 is substituted into the depiction of FIG. 2 with capacitor 224 replacing capacitor 190 and the output of junction 222 applied to terminals 168 and 182 of FIG. 2, it is seen that a higher load current will result in an earlier firing of the other load rectifier and hence a higher commutation current.

Thus, it is seen that the present invention provides a system for automatically compensating for variations in circuit parameters of an inverter circuit. This compensation effects a substantially constant commutation current so that sufficient power is available regardless of variations in operating parameter, such as fluctuations in source voltage, to insure that there is always proper commutation of the load rectifiers of the inverter circuit.

While there have been shown and described what are at present considered to be the preferred embodiments in the invention modifications thereto will readily occur to those skilled in the art. For example, other types of circuits could be utilized in developing the appropriate signals for determining the point on the commutation current curve at which the load rectifiers should be fired. In addition, other means not without the scope of the invention could be utilized for developing the compensating signals and other operating parameters could be utilized in developing the compensating signal. It is not desired, therefore, that the invention be limited to specific arrangements shown and described and it is intended to cover in the appended claims all such modifications as fall within the true scope and spirit of the invention.

What is claimed is:

1. In an inverter circuit of the type including at least one pair of controlled rectifiers for supplying electrical power to a load from a direct current power source and means for storing an electrical charge which is controllably utilized to provide a commutation current to render a then conducting controlled rectifier nonconductive, means for controlling the time for rendering said controlled rectifiers conductive comprising:
   a. means for sensing the commutation current during the commutation of either one of the controlled rectifiers and to provide a first signal indicative thereof;
   b. means to provide a second signal indicative of a variable circuit parameter; and,
   c. means responsive to said first and second signals to initiate conduction of the other of said controlled rectifiers when said first and second signals are of a prescribed relationship.

2. The invention in accordance with claim 1 wherein said means to provide the second signal is responsive to the value of the direct current source.

3. The invention in accordance with claim 1 wherein said means to provide the second signal is responsive to the value of current supplied to the load.

4. The invention in accordance with claim 1 wherein said prescribed relationship exists when said first and second signals are equal.

5. The invention in accordance with claim 1 wherein said second signal is substantially a ramp function.

6. The invention in accordance with claim 5 wherein the slope of the ramp function is determined by the amount of deviation of the variable circuit parameter from a predetermined value.

7. The invention in accordance with claim 6 wherein the variable circuit parameter is the direct current power source.

8. In an inverter circuit of the type including at least one pair of controlled rectifiers for supplying electrical power to a load from a direct current power source and means for storing an electrical charge which is controllably utilized to provide a commutation current to render a then conducting controlled rectifier nonconductive, means for controlling the time for rendering said controlled rectifiers conductive comprising:
   a. means to provide a first signal proportional to the commutation current during the commutation of either one of the controlled rectifiers;
   b. means to provide a second signal which varies at a rate governed by a variable circuit parameter; and,
   c. means to compare said first and second signals and to render a controlled rectifier conductive when said first and second signals are of a prescribed relationship.

9. The invention in accordance with claim 8 wherein the variable parameter governing said second signal is the direct current source.

10. The invention in accordance with claim 8 wherein the means to provide the second signal includes a capacitor which is charged at a rate dependent upon the value of the variable circuit parameter.

11. The invention in accordance with claim 10 wherein the rate of capacitor charging increases as the effective potential of the direct current power source decreases.

12. A controlled inverter circuit operable from a variable direct current source to provide alternating current to a load comprising:
   a. a pair of controlled rectifiers selectively operable to supply electrical current from said source to said load;
   b. a commutation circuit including a capacitor for supplying commutation current for rendering a then conducting controlled rectifier nonconductive;
   c. means responsive to said commutation current to provide a first signal representative thereof;
   d. means to provide a second signal representative of a variable circuit parameter; and,
   e. means responsive to a predetermined relationship between said first and second signals for rendering the other of said controlled rectifiers conductive.

13. The invention in accordance with claim 12 wherein the controlled rectifiers are silicon controlled rectifiers including a gating electrode.

14. The invention in accordance with claim 13 wherein the last mentioned means includes switching circuitry for supplying a pulse to the gating electrode of the silicon controlled rectifier.

15. The invention in accordance with claim 12 wherein the second signal varies in response to a change in the potential of the direct current source.

16. The invention in accordance with claim 12 wherein the second signal varies in response to the current supplied to said load.

17. The invention in accordance with claim 12 wherein said load is an alternating current motor.

18. The invention in accordance with claim 12 wherein said means to provide said second signal includes a capacitor and further includes means to vary the rate at which said capacitor is charged.

19. The invention in accordance with claim 12 said means to provide said second signal includes a capacitor, means to provide a feedback signal representing the potential of the direct current source, and means responsive to said feedback signal to vary the rate at which said additional capacitor is charged.

* * * * *